United States Patent
Zhao et al.

(10) Patent No.: US 12,241,807 B2
(45) Date of Patent: Mar. 4, 2025

(54) SYSTEM FOR TESTING INTELLIGENT VEHICLES

(71) Applicant: CHANG'AN UNIVERSITY, ShaanXi (CN)

(72) Inventors: Xiangmo Zhao, ShaanXi (CN); Wenwei Wang, ShaanXi (CN); Zhen Wang, ShaanXi (CN); Zhigang Xu, ShaanXi (CN); Runmin Wang, ShaanXi (CN); Jingjun Cheng, ShaanXi (CN); Ying Gao, ShaanXi (CN); Yizhe Cao, ShaanXi (CN); Dingrui Xue, ShaanXi (CN); Nanfeng Chen, ShaanXi (CN); Jianhui Di, ShaanXi (CN)

(73) Assignee: CHANG'AN UNIVERSITY, Xi'an (CN)

( * ) Notice: Subject to any disclaimer, the term of this patent is extended or adjusted under 35 U.S.C. 154(b) by 966 days.

(21) Appl. No.: 17/147,942

(22) Filed: Jan. 13, 2021

(65) Prior Publication Data

US 2022/0136930 A1    May 5, 2022

(30) Foreign Application Priority Data

Oct. 30, 2020   (CN) .......................... 202011188538.1

(51) Int. Cl.
 *G01M 17/007*     (2006.01)
(52) U.S. Cl.
 CPC ............................. *G01M 17/0072* (2013.01)

(58) Field of Classification Search
 CPC ............... G01M 17/0072; G05B 17/02; G05B 23/0243
 See application file for complete search history.

(56) References Cited

U.S. PATENT DOCUMENTS 10,489,993 B2 *  11/2019  Dan ........................ G06F 30/15

FOREIGN PATENT DOCUMENTS

| CN | 109163889 | A | * | 1/2019 | |
|---|---|---|---|---|---|
| CN | 109844488 | A |   | 6/2019 | |
| CN | 109100155 | B |   | 6/2020 | |
| CN | 110160804 | B | * | 7/2020 | |
| CN | 109084994 | B | * | 8/2020 | .......... G01M 17/007 |
| JP | 2017219524 | A | * | 12/2017 | |

OTHER PUBLICATIONS

Machine Translation CN-110160804-B (Year: 2020).*
Machine Translation CN-109163889-A (Year: 2019).*
Machine Translation JP-2017219524-A (Year: 2017).*

* cited by examiner

*Primary Examiner* — Jean Paul Cass
*Assistant Examiner* — Lidia Kwiatkowska

(57) ABSTRACT

A system for testing intelligent vehicles, including a test bench, a hardware-in-the-loop sub-system, a software-in-the-loop sub-system, a target-in-the-loop sub-system and a test management platform. The test bench is configured to simulate the resistance of the actual road according to the road resistance parameters, and simulate the posture of the actual road according to the road posture parameters.

8 Claims, 6 Drawing Sheets

SYSTEM FOR TESTING INTELLIGENT VEHICLES

CROSS-REFERENCE TO RELATED APPLICATIONS

This application claims the benefit of priority from Chinese Patent Application No. 202011188538.1, filed on Oct. 30, 2020. The content of the aforementioned application, including any intervening amendments thereto, is incorporated herein by reference in its entirety.

TECHNICAL FIELD

This application relates to intelligent vehicles, and more particularly to a system for testing intelligent vehicles.

BACKGROUND

Currently, the intelligent vehicles are tested mainly by model-in-the-loop testing, software-in-the-loop testing, hardware-in-the-loop testing, vehicle-in-the-loop testing, or closed-field testing. The model-in-the-loop testing and software-in-the-loop testing are both a purely digital simulation tool, which simulates a scenario using a dedicated automatic driving software, combined with models such as sensors, vehicle control and vehicle dynamics to identify the degree of standardization of the function module in intelligent vehicles. With respect to the hardware-in-the-loop testing, some real parts, such as environment perception, planning and decision-making, and control-execution sub-systems, of intelligent vehicles are connected into the test loop to test the stability and reliability of components and sub-systems. In contrast, in the vehicle-in-the-loop testing and the closed-field testing, the intelligent vehicle is integrated into the test loop in its entirety to demonstrate the safety and functionality of the integrated system.

Actually, the model-in-the-loop testing and software-in-the-loop testing both pertain to virtual simulation testing, which are mainly used to verify the control algorithm of the intelligent vehicles in the phase of functional testing. The virtual simulation test has the advantages of low risk, high efficiency and low cost since the vehicle, sensor and traffic environment are all virtual. In the model-in-the-loop testing, the simulation is performed in the development environment of the model, and a series of test cases are input to verify whether the control algorithm model accurately fulfills the functional requirements. The software-in-the-loop testing is essentially an equivalence test to verify whether the functions implemented by the code on the computer are completely consistent with the functions of the control model. Basically, the test cases, which are completely the same as those in the model-in-the-loop testing, are input in the software-in-the-loop testing, and then the two test outputs are compared to determine whether the deviation therebetween is acceptable. However, these two kinds of test methods both overly rely on the established model, so the inaccurate or wrong simulation model will greatly lower the test accuracy. The hardware-in-the-loop testing is performed by incorporating some sub-systems associated with environment perception, planning and decision-making, and control and execution of intelligent vehicles into the test loop, and has been widely studied and applied in industry and academia.

Neither the virtual simulation testing nor the hardware-in-the-loop testing is suitable for the testing of system-level performances of vehicles. Specifically, the vehicles, sensors, and traffic environment in the virtual simulation testing are virtual and all built based on mathematical models, so they are still different from actual test conditions. By contrast, the hardware-in-the-loop has been improved on this basis by connecting environment perception, planning and decision-making, and control-execution sub-systems of intelligent vehicles into the test loop. However, changes occurring to the operating environment during the practical test will affect the effectiveness of the test.

Different from the testing methods mentioned above, both the vehicle-in-the-loop testing and the closed-field testing incorporate the whole intelligent vehicle to the test loop to realize the overall test of the vehicle's perception layer, decision-planning layer, and control-execution layer, which makes the test results more consistent with those obtained under actual operating conditions. The vehicle-in-the-loop testing is performed mainly based on site or test platform. The test results of the site-based vehicle-in-the-loop testing are not only limited by the area of the test site, but also affected by different test environment parameters, failing to ensure the test repeatability. Moreover, this test method also has high cost.

The existing test systems for intelligent vehicles can merely provide a single test tool, for example, some test systems fail to perform related hardware-in-the-loop testing after the virtual simulation testing, or fail to complete the vehicle testing having high integration.

SUMMARY

An object of this application is to provide a system for testing intelligent vehicles, into which multiple test tools are integrated, making it possible to test the intelligent vehicles by different tools.

Technical solutions of this application are described as follows.

This application provides a system for testing an intelligent vehicle, comprising:
   a test bench;
   a hardware-in-the-loop sub-system;
   a software-in-the-loop sub-system;
   a target-in-the-loop sub-system; and
   a test management platform;
   wherein the test bench is configured to load the intelligent vehicle, and simulate a resistance of an actual road according to road resistance parameters and a posture of the actual road according to posture parameters;
   the hardware-in-the-loop sub-system is configured to construct a specific test environment for hardware of the intelligent vehicle, and send data of a test scenario to the hardware of the intelligent vehicle via the specific test environment to test response of the intelligent vehicle in the test scenario;
   the software-in-the-loop sub-system is configured to input the data of the test scenario into an electronic control unit of the intelligent vehicle to test the response of the intelligent vehicle in the test scenario;
   the target-in-the-loop sub-system is configured to present different traffic scenario targets in a specific way, respectively, to test identification and response of the intelligent vehicle to the traffic scenario targets; and
   the test management platform is configured to generate the data of the test scenario, and send the data of the test scenario to the hardware-in-the-loop sub-system when a hardware-in-the-loop testing is performed, or send the data of the test scenario to the software-in-the-loop sub-system when a software-in-the-loop testing is performed, or control the target-in-the-loop sub-system to present different traffic scenario targets when a target-in-the-loop testing is performed; the test management platform is further configured to generate the road resistance parameters and posture parameters, and send the resistance parameters and the posture parameters to the test bench; and the test management platform is further configured to receive and save test data of the response of the intelligent vehicle in the test scenario and test data of the identification and response of the intelligent vehicle to the traffic scenario targets.

In some embodiments, the test bench comprises a road resistance simulation sub-system, a roller, and a servo motor; the servo motor is configured to drive the roller; and the road resistance simulation sub-system is configured to perform proportional-integral-derivative (PID) control on the servo motor according to the road resistance parameters to allow the servo motor to drive the roller to apply corresponding road resistance to tires of the intelligent vehicle.

In some embodiments, the test bench further comprises a test stand and a road posture simulation sub-system; and the road posture simulation sub-system is configured to calculate a pitch angle and a roll angle of the test stand according to the road posture parameters, and control the test stand to move to a posture corresponding to the pitch angle and the roll angle to realize the simulation of the posture of the actual road.

In some embodiments, the test bench further comprises a steering follow-up sub-system; and the steering follow-up sub-system is configured to follow a steering angle of wheels of the intelligent vehicle to measure the steering angle of the wheels.

In some embodiments, the hardware-in-the-loop sub-system comprises a millimeter-wave radar hardware-in-the-loop module; the millimeter-wave radar hardware-in-the-loop module comprises a millimeter-wave radar anechoic chamber and a millimeter-wave radar target simulator; and the millimeter-wave radar hardware-in-the-loop module is configured to send a millimeter-wave signal to a millimeter-wave radar placed in the millimeter-wave radar anechoic chamber according to the data of the test scenario, so as to perform an anechoic test of the millimeter-wave radar.

In some embodiments, the hardware-in-the-loop sub-system further comprises a camera hardware-in-the-loop module, and the camera hardware-in-the-loop module comprises a video camera obscura and a display; and the display is configured to display a video of the test scenario to a camera placed in the video camera obscura according to the data of the test scenario, so as to perform a camera obscura test of the camera.

In some embodiments, the hardware-in-the-loop sub-system further comprises a vehicle-to-everything device hardware-in-the-loop module; and the vehicle-to-everything device hardware-in-the-loop module is configured to convert information of a traffic participant in the data of the test scenario into vehicle-to-everything air interface signals and send the vehicle-to-everything air interface signals to an on-board unit of the intelligent vehicle, so as to perform on-board unit-in-the-loop testing; and the vehicle-to-everything device hardware-in-the-loop module is also configured to perform signaling testing on a vehicle-to-everything communication terminal of the intelligent vehicle.

In some embodiments, the target-in-the-loop sub-system comprises at least one of a traffic sign, a gantry, a road marking simulator, a movable object, an obstacle simulator, an environment simulator and an electronic traffic sign;

the traffic sign is placed on the test bench to test a capability of the intelligent vehicle to identify and detect the traffic sign;

the gantry is arranged on the test bench to display gantry information, so as to test a capability of the intelligent vehicle to identify the gantry information;

the road marking simulator is configured to simulate markings of the actual road to test a capability of the intelligent vehicle to identify the markings;

the movable object and the obstacle simulator are configured to drive a mobile platform carrying a simulated traffic participant to move according to a preset route, so as to test a capability of the intelligent vehicle to identify the movable object and an obstacle;

the environment simulator is configured to adjust parameters of a test environment; and the electronic traffic sign is configured to display traffic signs via a LED screen to test a capability of the intelligent vehicle to identify the electronic traffic sign.

In some embodiments, the test management platform generates the data of the test scenario from a database of natural traffic scenarios through a cross-entropy importance sampling method.

In some embodiments, the system further comprises an audio-visual workstation; and the audio-visual workstation is configured to display videos and sounds of the test scenario.

Compared to the prior art, this application has the following beneficial effects.

Due to the integration of a test bench, a hardware-in-the-loop sub-system, a software-in-the-loop sub-system and a target-in-the-loop sub-system, the system provided herein for testing intelligent vehicles can meet the requirements of the vehicle-in-the-loop testing, hardware-in-the-loop testing, software-in-the-loop testing, and target-in-the-loop testing of the intelligent vehicles, offering more comprehensive testing for intelligent vehicles. At the same time, the test bench can simulate the resistance of the actual road according to the resistance parameters, and simulate the posture of the actual road according to the posture parameters, which enables the test scenario to be closer to the practical driving condition, thereby enhancing the test effect.

DETAILED DESCRIPTION OF EMBODIMENTS

Figure 1:
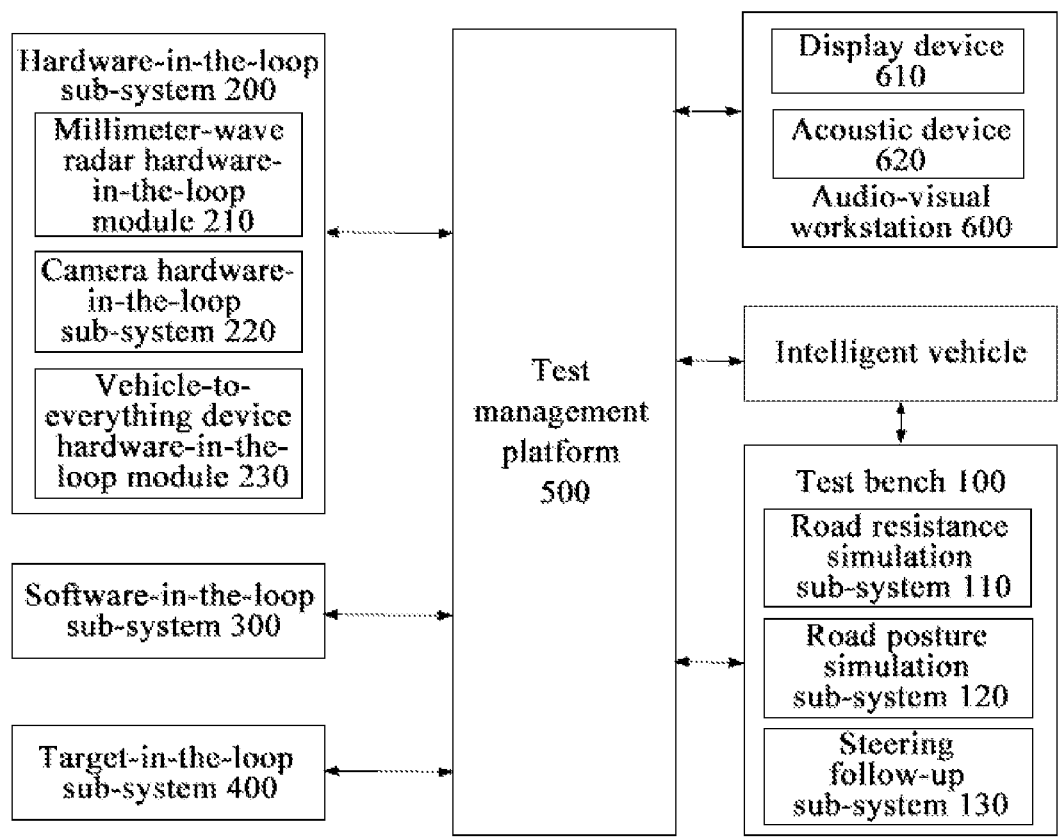
FIG. 1 is a schematic diagram of a system for testing an intelligent vehicle according to an embodiment of the present disclosure.

This application will be further described below in detail with reference to the embodiments and accompanying drawings. Similar elements in different embodiments are labeled with related numbers. In the following embodiments, the detailed descriptions are merely intended to help the understanding of this application. However, it should be understood by those skilled in the art that in some cases, some features are not necessary, or can be replaced by other components, materials, and methods. It should be noted that some operations are not shown or described in the specification to prevent the core part of this application from being overwhelmed by excessive descriptions, and those skilled in the art can get access to these operations based on the specification and the general technical knowledge in the art.

In addition, the features, operations characteristics described in the specification can be combined in any appropriate manner. At the same time, the steps or actions in the method can also be sequentially exchanged or adjusted. Therefore, the sequences presented in the specification and the drawings are only for the purpose of clearly describing a specific embodiment, and are not meant to be necessary unless otherwise specified.

As used herein, terms "first", "second", etc., are only used to distinguish the described objects and do not have any sequence or technical meaning. Unless otherwise specified, term "connection" (or "ligation") used herein includes direct and indirect connection (or ligation).

Some explanations are made to intelligent vehicles and testing techniques thereof before introducing the invention.

In terms of architecture, an intelligent vehicle usually includes a perception layer, a decision-planning layer, and an execution layer. The perception layer is used to collect environmental information and in-vehicle information, and then perform road boundary detection, vehicle detection, and pedestrian detection mainly through sensors such as laser radar, millimeter-wave radar, and camera. The decision-planning layer is configured to make decisions and judgments according to the acquired information to determine an appropriate working model, formulate corresponding control strategies, and make driving decisions. Actually, the decision-planning layer roughly plays a role in assigning tasks to vehicles. The executive layer is configured to control the vehicle to make corresponding driving actions according to the driving decisions.

In addition, intelligent vehicles also need the support of high-precision maps and the internet of vehicles (IOV). Briefly, the implementation of self-service navigation is inseparable from the high-precision maps, and with the help of the IOV, the interaction between vehicles and vehicles, vehicles and people, and vehicles and roads can be realized, further improving the perception capability to the surrounding environment.

The test technology of intelligent vehicles generally includes test methods, test tools and test acceleration.

The test method mainly includes use-case testing, scenario testing and road testing. The use-case testing is mainly used to test the response of a certain function of the intelligent vehicle during the test, such as single function in the development of autonomous driving, performance of advanced driving assistance system (ADAS) and active safety. The scenario testing is mainly used to determine the response of an intelligent vehicle to a specific target or task in a preset scenario, such as rural scenarios, urban scenarios, and highway scenarios. The road testing is performed in a real road or a real traffic environment, where traffic events involving environmental conditions, dynamic targets, road information, and road infrastructure all occur randomly.

Testing tools mainly include model-in-the-loop testing, software-in-the-loop testing, hardware-in-the-loop testing, vehicle-in-the-loop testing, and closed-field testing, which have been introduced above.

Test acceleration is to accelerate the test process, shorten the test time, and reduce the test consumption mainly through improving the efficiency of test tools and test processes. The core idea of the test acceleration is that if the intelligent vehicle can pass the test under extremely dangerous scenarios, the vehicle has desirable performance under normal scenarios. The development of test scenarios for intelligent vehicles is inseparable from real traffic data. The reliability of the test and evaluation program will be greatly improved if the dangerous and extreme scenario data in the accident data and natural driving data are incorporated into the test process. The acceleration of the test process is to increase the probability of dangerous scenarios and extreme scenarios during the test to increase the frequency that the vehicle to be tested experiences such scenarios within a unit time. The core of the test acceleration is to use Monte Carlo simulation to sample according to the probability density function of real traffic behaviors in the natural traffic scenario data set, increasing the probability of dangerous scenarios and extreme scenarios to achieve the test acceleration. Since the test scenarios collected by Monte Carlo simulation according to the natural traffic scenario data set are less probably to include extreme scenarios and dangerous scenarios, this sampling method will cause a considerable amount of calculation due to the high rejection rate. By contrast, the test scenarios generated based on the traffic accident data pay too much attention to extreme scenarios and thus cannot fully reflect the real traffic conditions.

The system provided herein for testing intelligent vehicles will be described below.

As shown in FIG. 1, in an embodiment, the system for testing an intelligent vehicle includes a test bench 100, a hardware-in-the-loop sub-system 200, a software-in-the-loop sub-system 300, a target-in-the-loop sub-system 400, and a test management platform 500.

The test bench 100 is configured to load the intelligent vehicle, simulate the resistance of the actual road according to the road resistance parameters, and simulate the posture of the actual road according to the posture parameters. As shown in FIG. 1, the test bench 100 includes a road resistance simulation sub-system 110, a road posture simulation sub-system 120, a steering follow-up sub-system 130, a test stand (not shown in the figures), a servo motor (not shown in the figures) for driving the test stand, a roller 140 and a servo motor 150 for driving the roller 140.

The road resistance experienced by the intelligent vehicle during driving mainly includes road friction resistance, a translational inertia of the vehicle and wind resistance. During the test, the translational inertia and wind resistance can be generated by adjusting the road friction resistance. The motion state of a vehicle is directly related to the road resistance. Intelligent vehicles will encounter different road resistances in actual use, which will further affect the running state of the intelligent vehicle and challenges the core algorithm of the intelligent vehicle. Therefore, the roller 140 is required to have the capability to simulate different road resistances to fully test the performance of the intelligent vehicle.

The road resistance can be controlled and adjusted through connecting a servo system, a torque controller or a flywheel to the roller 140. The principle of the road resistance simulation based on a torque controller is that magnetic powder between the inner and outer rotors is controlled by current to realize torque transmission. However, this simulation method has defects such as complex structure, low control accuracy, and high maintenance cost. The simulation method based on the flywheel suffers from certain limitations and fails to complete the stepless simulation because the inertia of the mounted flywheel is fixed, and the test can only be carried out for a fixed vehicle model. By comparison, the servo system can flexibly and accurately simulate the road resistance.

Figure 2:
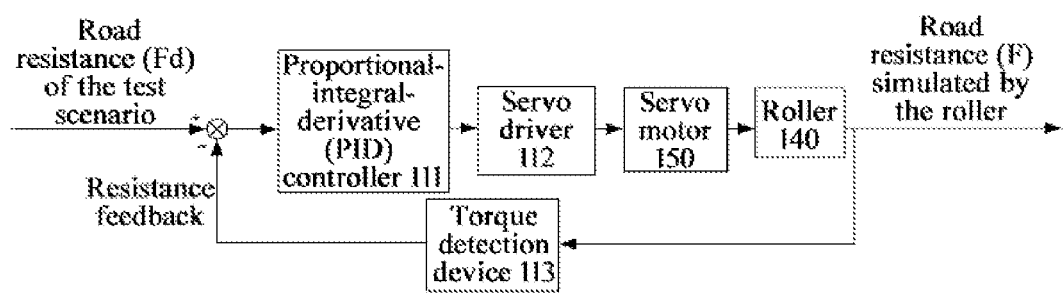
FIG. 2 is a schematic diagram of a road resistance simulation sub-system according to an embodiment of the present disclosure.

In the present invention, the road resistance simulation sub-system 110 uses a servo system, in which the servo motor for driving the roller 140 is subjected to realize the simulation of road resistance by performing PID control on which. As shown in FIG. 2, the road resistance simulation sub-system 110 includes a PID controller 111, a servo driver 112 and a torque measurement device 113. The test management platform 500 sends the generated road resistance parameters of the test scenario to the road resistance simulation sub-system 110. The difference between the road resistance parameters and the torque of the roller 140 detected by the torque measurement device 113 is subjected to calculation by the PID controller 111 to obtain a control instruction. The control instruction is sent to the servo driver 112, and then the servo driver 112 controls the servo motor 150 to drive the roller 140 to apply resistance to the wheels according to the set three-loop control parameters, so as to load a road resistance in the test scenario. The road resistance is simulated through the road resistance simulation sub-system 110, and applied to the wheels of the intelligent vehicle, which makes it possible to perform the actual road testing or the closed-field testing at an indoor laboratory. As a consequence, the rental cost of site and equipment is lowered, and the testing can be repeated in the test scenario.

Figure 3:
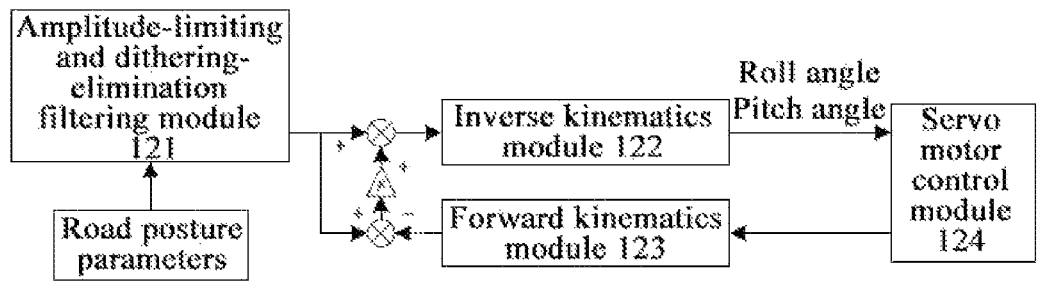
FIG. 3 is a schematic diagram of a road posture simulation sub-system according to an embodiment of the present disclosure.

The road posture simulation sub-system 120 is configured to simulate the slope and inclination of the road model in the test scenario, so that the motion state of the intelligent vehicle is closer to the actual situation during the test. The slope and inclination of the road model can be stimulated according to the pitch angle and roll angle of the test stand, respectively. As shown in FIG. 3, the road posture simulation sub-system 120 includes an amplitude-limiting and dithering-elimination filtering module 121, an inverse kinematics module 122, a forward kinematics module 123 and a servo motor control module 124.

The amplitude-limiting and dithering-elimination filtering module 121 is configured to receive the posture parameters, including slope and inclination of the road model, sent by the test management platform 150. The road posture parameters are divided into a low amplitude part and a high amplitude part, where the low amplitude part is directly sent to subsequent modules for processing, and the high amplitude part needs to complete an action reset before being sent to the subsequent module for processing due to the limitation in the structure of the test stand. The inverse kinematics module 122 is configured to calculate the pitch and roll angles of the test stand according to the posture parameters through an inverse kinematics algorithm. The forward kinematics module 123 is used to calculate the difference between the current pitch angle of the test stand and the target pitch angle and the difference between the current roll angle of the test stand and the target roll angle, which are amplified by a scale factor K to be used as a feedback signal of the inverse kinematics module 122. The servo motor control module 124 is used for controlling the servo motor to drive the test stand to move according to the pitch angle and the roll angle of the test stand calculated by the forward kinematics module 123 to realize the corresponding posture.

Figure 4:
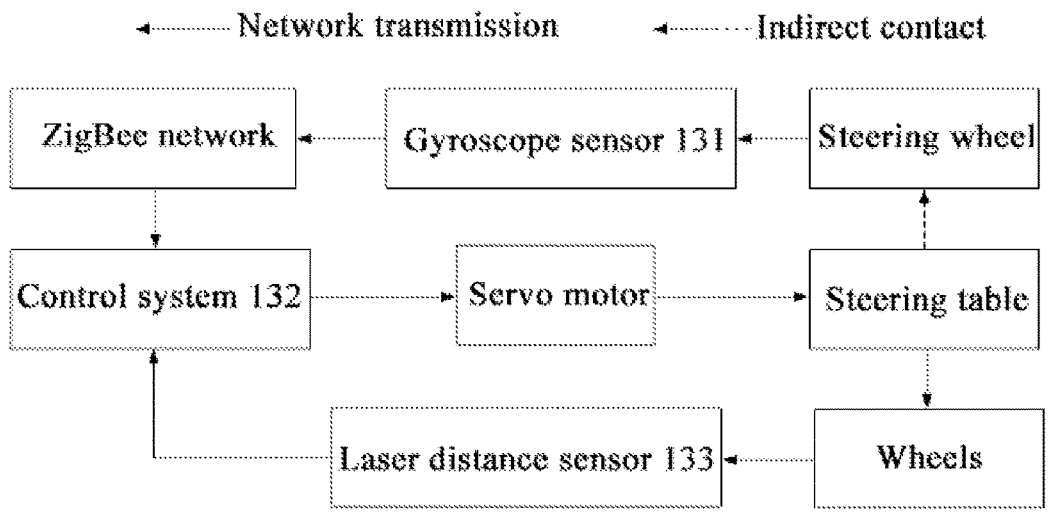
FIG. 4 is a schematic diagram of a steering follow-up sub-system according to an embodiment of the present disclosure.
Figure 5:
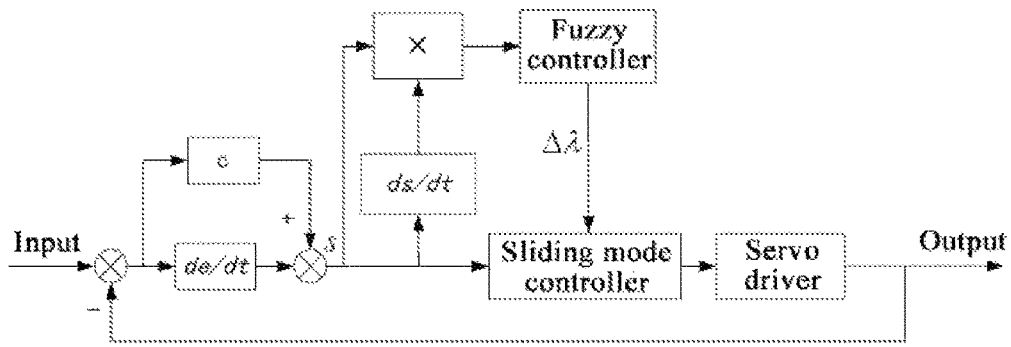
FIG. 5 is a schematic diagram of a control system of the steering follow-up sub-system according to an embodiment of the present disclosure.

Currently, a traditional drum test bench is widely used in the testing of intelligent vehicles, but its roller can only roll but cannot steer, so that it is impossible to test the steering angle of the intelligent vehicle, limiting the test of intelligent vehicle in some scenarios. In the present invention, a steering follow-up sub-system 130 is arranged on the test bench 100 to follow the steering angle of the wheels of the intelligent vehicle to measure the steering angle of the wheels. As shown in FIG. 4, the test bench 100 includes a steering table for driving the wheels of the intelligent vehicle to rotate and a servo motor for driving the steering table. The steering follow-up sub-system 130 includes a gyroscope sensor 131 arranged on the steering wheel of the intelligent vehicle, a control system 132 and a laser distance sensor 133 configured to detect the change of the tire of the intelligent vehicle. The gyroscope sensor 131 is configured to detect the steering angle of the steering wheel and send the detected data to the control system 132 through the ZigBee network. The control system 132 processes the tire change detected by the laser distance sensor 133 and the steering wheel angle detected by the gyroscope sensor 131 through the sliding mode control algorithm to generate the symbol pulse and direction pulse for controlling the servo motor to drive the steering table to rotate, completing the steering follow-up. As shown in FIG. 5, in the control system, the difference between the target steering angle at the input end and the steering angle fed back at the output end is the steering angle difference c. The steering angle difference c and its change rate are summed to form the sliding mode surface s, and the product of the sliding mode surface s and its change rate constitutes the input of the fuzzy controller. A parameter AA that controls the sliding mode controller is generated through the operation of the fuzzy controller. After receiving the output command of the sliding mode controller, the servo drive performs the three-loop control on the servo drive according to the set proportional gain, feedforward gain and integral gain. The servo drive controls the servo motor to drive the steering table to rotate to the target steering angle, where the target steering angle at the input end of the control system can be composed of the tire change and steering wheel angle. The servo drive can be Delta ASDA-A2-0721-L, and the main control chip of the control system can be STM32F103C8T6 manufactured by STMicroelectronics Co., Ltd.

The hardware-in-the-loop sub-system 200 is configured to construct a specific test environment for the hardware of the intelligent vehicle, and send data of the test scenario to the hardware of the intelligent vehicle through the specific test environment, so as to test the response of the intelligent vehicle in the test scenario. As shown in FIG. 1, in an embodiment, the hardware-in-the-loop sub-system 200 includes a millimeter-wave radar hardware-in-the-loop module 210, a camera hardware-in-the-loop module 220, and a vehicle-to-everything device hardware-in-the-loop module 230, which are specifically described below.

Figure 6:
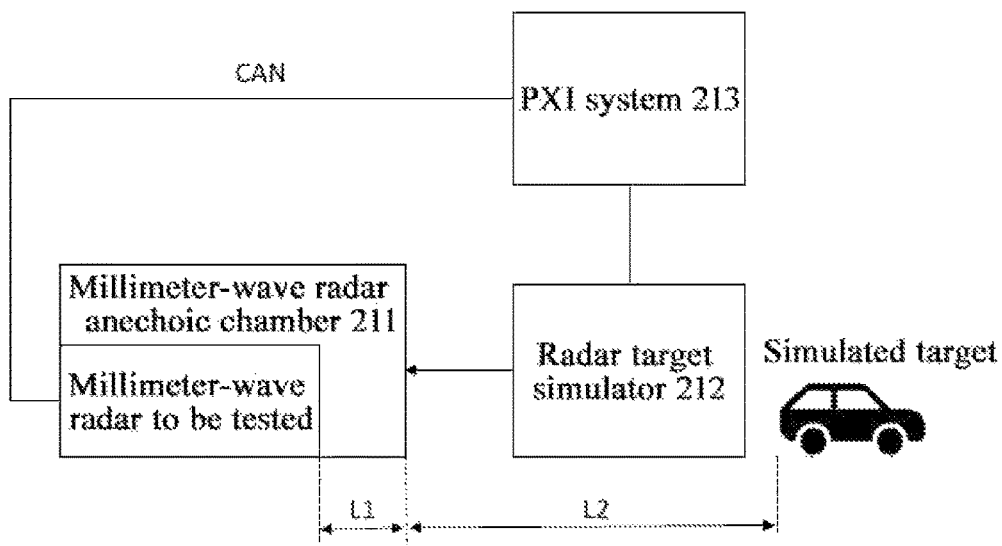
FIG. 6 is a schematic diagram of a millimeter-wave radar hardware-in-the-loop module according to an embodiment of the present disclosure.

The millimeter-wave radar can transmit electromagnetic waves and receive reflected electromagnetic wave signals, and then analyze the reflected electromagnetic wave signals to obtain physical information such as distance, speed, angle, and radar cross section of target. Millimeter-wave radar is less affected by the weather conditions compared to visual and acoustic sensors, and thus plays a more important role in the implementation of various functions of advanced driver assistance system (ADAS), so that the test of millimeter-wave radar is important for the testing of the perception layer of the intelligent vehicle. The millimeter-wave radar hardware-in-the-loop module 210 is mainly configured to test the millimeter-wave radar of the intelligent vehicles by building a millimeter-wave radar anechoic chamber. Referring to FIG. 6, the millimeter-wave radar hardware-in-the-loop module 210 includes a millimeter-wave radar anechoic chamber 211 and a radar target simulator 212, a PXI system 213 and a radar turret (not shown in the figures). The millimeter-wave radar to be tested is placed in the millimeter-wave radar anechoic chamber 211, where the millimeter-wave radar anechoic chamber 211 is provided with a radar-absorbing material to absorb the interference signal of the anechoic chamber, reducing the impact on the test process. The radar target simulator 212 is controlled by the PXI system to send millimeter-wave signals to the millimeter-wave radar to be tested. The PXI system 213 can adjust the transmit power of the millimeter-wave probe of the radar target simulator 212, and control the vector signal transceiver (VST) of the radar target simulator 212 to achieve the simulation of parameters, such as number of targets, Doppler effect, test distance, radar cross section and target speed, so as to simulate various test scenarios. The user can realize the programming and control of the PXI system 213 according to the visual interface LabVIEW, and transmit the data of the test scenario to the PXI system 213, so as to realize the control of the radar target simulator 212 to send the millimeter-wave signal corresponding to the test scenario. Due to the limitation in the installation distance L1 of the millimeter-wave radar anechoic chamber, the distance between the simulation target and the millimeter-wave radar is the sum of the installation distance L1 and the simulation distance L2. The radar turret can drive the millimeter-wave radar to be tested to rotate to achieve the signal reception at different angles.

Figure 7:
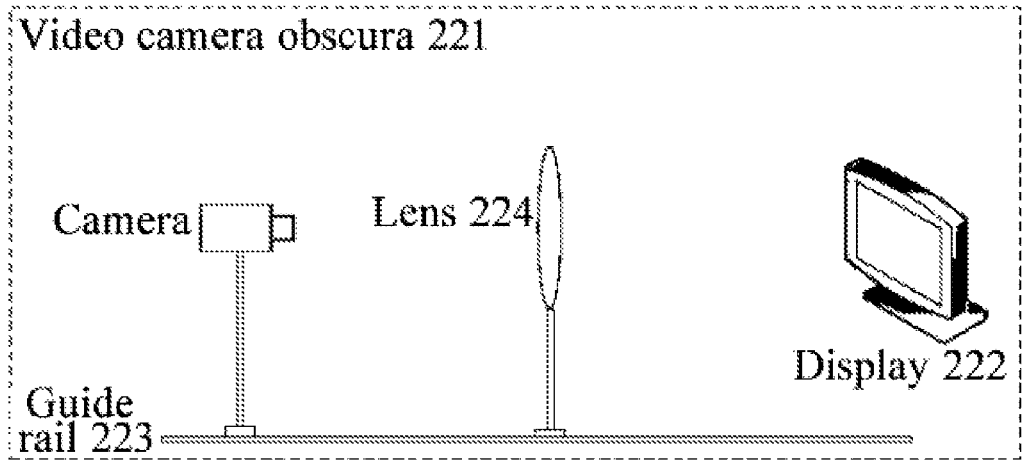
FIG. 7 is a schematic diagram of a camera hardware-in-the-loop module according to an embodiment of the present disclosure.

As shown in FIG. 7, the camera hardware-in-the-loop module 220 includes a video camera obscura 221, a display 222, a guide rail 223 and a lens 224. The camera of the intelligent vehicle, the display 222 and the lens 224 are placed in the video camera obscura 221 to implement the camera obscura test and avoid the interference of external environment to the camera. The camera is arranged on the guide rail 223, and the bracket for supporting the camera is also designed into a guide rail structure to adjust the height, left-right displacement, and front-back distance of the camera, rendering the image captured by the camera consistent with the actual situation. The lens 224 is arranged between the camera and the display 222, and is configured to generate an image on the camera. During the test, the display 222 displays the visual information of the environment surrounding the intelligent vehicle in the test scenario in real time, and the camera placed in front of the display 222 collect these test scenarios, and then send them to an on-board computer through the Ethernet network. The on-board computer processes these test scenarios through image identification algorithms.

After collected by the camera, the information displayed on the screen of the display can be described through a light field camera model, that is, the visual signals received by the human vision system and the machine vision system are described with the plenoptic function through the light field camera model. In the plenoptic function, the dimensional information of space, time and spectrum is further subdivided into three-dimensional space, two-dimensional angle, one-dimensional time, one-dimensional spectrum and its corresponding intensity information. Based on this function, the video signal in the camera obscura can be collected and reconstructed more completely to achieve the high-precision observation and test.

Figure 8:
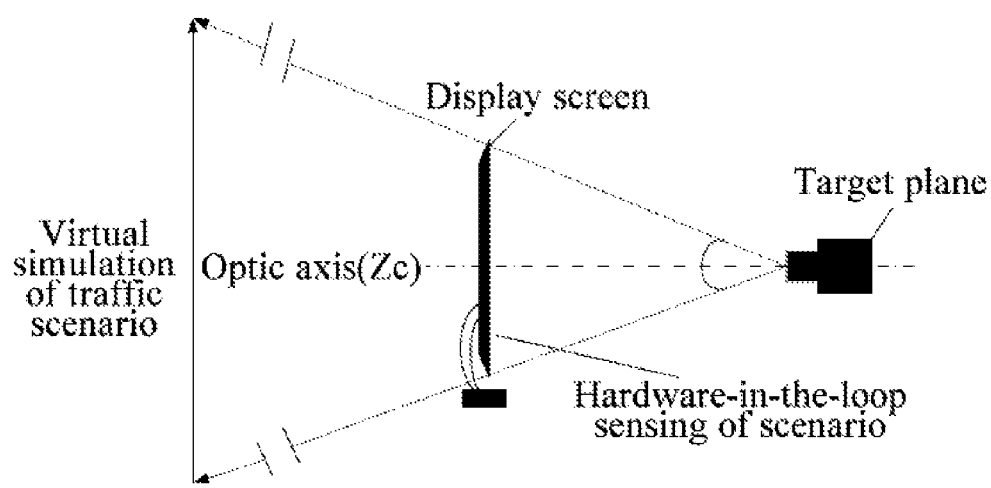
FIG. 8 schematically illustrates the principle of a camera hardware-in-the-loop testing according to an embodiment of the present disclosure.

As shown in FIG. 8, when the actual traffic scenario is captured by the camera of the intelligent vehicle, the three-dimensional traffic scenario information will be projected onto the two-dimensional target plane, and the parameter representing depth of field will be lost in the process. Due to the loss of information about the depth of field, the imaging of the virtual simulation traffic scenario generated by the target plane of the camera through the hardware-in-the-loop perception scenario (i.e., the test scenario) is the same as the imaging of the actual traffic scenario. During the test, the position of the camera needs to be adjusted by the guide rail to enable the viewing angle of the camera to cover the screen. The signal intensity received by the target plane is adjusted to ensure the data fidelity during the test process.

The internet of vehicle hardware-in-the-loop module 230 includes radio frequency devices, such as a vector signal source and a wireless communication tester, and CANoe.Car2x simulation tools. The vector signal source can be SMW200A, and the wireless communication tester can be CMW500. The radio frequency devices can convert the information of various traffic participants (vehicles and roadside facilities) in the test scenario into V2X (vehicle-to-everything) air interface signals (Uu/PC5) and send them to an on-board unit (OBU). At the same time, a signaling testing can be performed on the radio frequency performance of the V2X communication terminal of the intelligent vehicle to evaluate the radio frequency consistency. The CANoe.Car2x simulation tool can be used to create and simulate detailed V2X traffic scenarios according to the network layer and application layer protocols of the intelligent transport system (ITS) protocol stack, and support the further verification of the connectivity of the cellular vehicle-to-everything (C-V2X). Moreover, the CANoe.Car2x simulation tool complies with the relevant European, American and Chinese standards, and can meet the testing requirements of application layer of the vehicle to everything.

The software-in-the-loop sub-system 300 is configured to input the data of the test scenario into the electronic control unit of the intelligent vehicle to test the responsiveness of the intelligent vehicle in the test scenario, where the input of the test scenario data into the electronic control unit of the intelligence vehicle is performed mainly through the software model of the simulation software Prescan. The model mainly includes lidar models, millimeter-wave radar models, camera models, ultrasonic radar models, global positioning system (GPS), inertial measurement unit (IMU) and V2X equipment.

Figure 9:
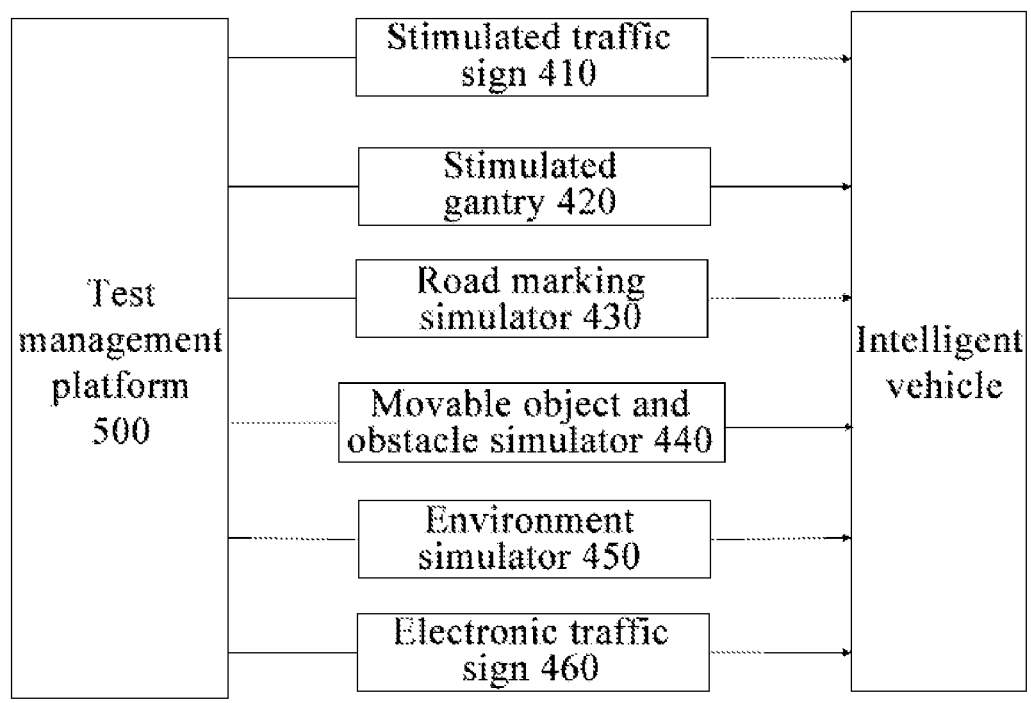
FIG. 9 is a schematic diagram of a target-in-the-loop sub-system according to an embodiment of the present disclosure.

The target-in-the-loop sub-system 400 is used to present different traffic scenario targets in a specific manner to test the identification and response of the intelligent vehicle to the traffic scenario targets. As shown in FIG. 9, the target-in-the-loop sub-system 400 includes at least one of a traffic sign 410, a gantry 420, a road marking simulator 430, a movable object, an obstacle simulator 440, an environment simulator 450 and an electronic traffic sign 460. The traffic sign 410 is placed on the testing bench 100 to test identification and detection capability of the intelligent vehicle to the traffic sign at different locations. The traffic sign includes speed limit sign, no-parking sign, construction sign and merging sign. The gantry 420 is provided on the testing bench 100 to display the gantry information to test the capability of the intelligent vehicle to identify the gantry information, where the gantry information includes fog warning and traffic information broadcast. The road marking simulator 430 is configured to simulate markings of the actual road to test the capability of the intelligent vehicle to identify the road markings. The movable object and the obstacle simulator 440 are configured to drive a mobile platform carrying a simulated traffic participant to move according to a preset track, so as to test the capability of the intelligent vehicle to identify the movable object and obstacle. The simulated traffic participants include dummy, simulation vehicle and simulation animal. The environmental simulator 450 is configured to adjust parameters of the test environment, such as light and humidity, so as to improve the repeatability of the test and realize the simulation of extreme environmental conditions.

The electronic traffic sign 460 is configured to display a traffic sign via a LED screen to test the capability of the intelligent vehicle to identify the electronic traffic sign, so as to complete the test of the visual perception capability of the intelligent vehicle. When a target-in-the-loop testing is performed, the user can control the target-in-the-loop sub-system 400 to present different traffic scenario targets in the test environment through the test management platform 500, and the intelligent vehicle perceives the target in the test environment on the test bench 100.

The test management platform 500 is configured to manage the test system of the intelligent vehicle, and provide functions such as setting of test stand parameters, generation of test scenario data, acceleration of the sampling in test scenario, and query of test data. The parameter setting of the test stand is mainly to set the relevant parameters of the test stand to correspond to the parameters of the intelligent vehicle, so as to maximize the performance of the test tool. During the test process, the user can test the intelligent vehicle using different test tools. The test management platform 500 can generate the test scenario data. When the hardware-in-the-loop testing is performed, the test scenario data is sent to the hardware-in-the-loop sub-system 200; when the software-in-the-loop testing is performed, the test scenario data is sent to the software-in-the-loop sub-system 300; when the target-in-the-loop testing is performed, the target-in-the-loop sub-system 400 is controlled to present different traffic scenario targets. At the same time, the test management platform 500 can also generate road resistance parameters and road posture parameters according to the test scenario, and can send them to the test bench 100 to enable the test bench 100 to simulate conditions of the actual road. In the generation of the test scenario, the test management platform 500 performs the test acceleration through the cross-entropy importance sampling, so as to speed up the test process, shorten the test time, and reduce the test consumption. Certainly, the test can also be accelerated through an existing acceleration method. The test scenario can be selected according to the "Test Procedures for Autonomous Driving of Intelligent and Connected Vehicles". The test items can be divided into basic function test, infrastructure response test, traffic participant test and planar cross intersection and signal light response test according to the test scenario. During the test, the test management platform 500 can also receive and save the test data associated with the response of the intelligent vehicle to the test scenario and the test data and results of the identification and response of the target in the traffic scenario. At the same time, the test management platform 500 also provides a data query function to enable the user to query the test data and results through the test management platform 500. The user can query the test data and results of a specific test item in a specific time period, as well as the start time, end time, test number, vehicle ID, test user and other information. In an embodiment, the test management platform 500 also supports the export and visual display of test data, which provides a basis for improving the performance of the intelligent vehicle and generating a test report.

Figure 10:
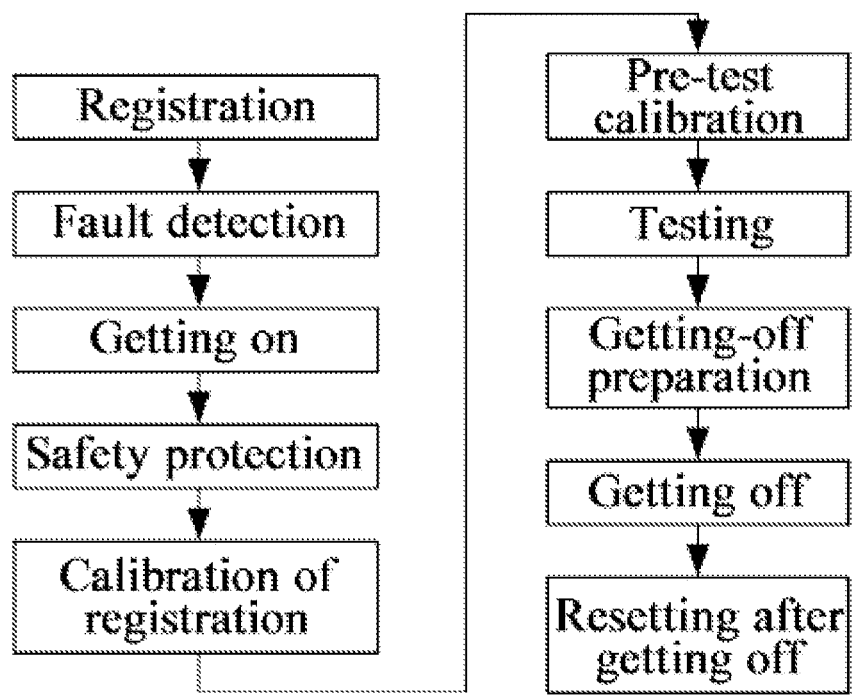
FIG. 10 schematically shows a process for testing an intelligent vehicle according to an embodiment of the present disclosure.

As shown in FIG. 10, the process of testing the intelligent vehicle using the system of the disclosure involves procedures of registration, fault detection, getting on, safety protection, calibration of registration, pre-test calibration, testing, getting-off preparation, getting off and resetting after getting off. During the registration and login process, the intelligent vehicle is driven into the waiting area of the test area where the test system is located, and undergoes processes such as registration, resistance model calibration, steering calibration, and weighing. The registration is mainly intended to complete the numbering of the intelligent vehicles and the calibration of basic parameters of the intelligent vehicle, such as length, width and height, and wind resistance coefficient of the tires. The resistance model calibration mainly includes the debugging of the curve relationship among speed, torque and power of the resistance model system. The steering calibration is to set initial values of the transverse and longitudinal movement of the tires of the intelligent vehicle. The weighing is to provide a basis for the load of the four tires of the intelligent vehicle. The fault detection is a step in which the self-inspection for the test system is performed to determine whether there is a failure in the test system. When there is a failure, a command of "resetting before boarding" is sent to the test system according to the fault information. At this time, the test system adjusts the wheelbase of the test stand to lock the roller and steering follow-up sub-system 130, so as to ensure that the intelligent vehicle can smoothly travel into the test stand. After the intelligent vehicle enters the test stand, the safety protection is performed mainly by tightly fixing the intelligent vehicle with the tension rope on the test stand to ensure the absolute safety in the test process. The calibration of registration is mainly to realize the correspondence between the test scenarios and the test stand according to the straight road section in each test scenario. The pre-test calibration is mainly for the purpose of setting the steering parameters of the steering follow-up sub-system 130, measuring the speed of the roller, and adjusting the road resistance simulation sub-system 110. During the test, the test scenario data is sent to the intelligent vehicle through the hardware-in-the-loop sub-system 200 or the software-in-the-loop sub-system 300, or the traffic scenario object is presented to the intelligent vehicle through the target-in-the-loop sub-system 400. The intelligent vehicle will respond to the test scenario and execute actions according to its own control algorithm. The test bench 100 simulates the road conditions according to the road resistance parameters and road posture parameters in the test scenario. The test management platform 500 receives the test data, and correspondingly updates the test scenario according to the test data. After the test, the test system executes the getting-off preparation and makes adjustments to enable the intelligent vehicle to smoothly leave the test stand. The test system will be reset after the intelligent vehicle leaves the test bench.

In an embodiment, the system for testing intelligent vehicles further includes an audio-visual workstation. As shown in FIG. 1, the audio-visual workstation includes a display device 610 and an acoustic device 620. The acoustic device 620 can play sounds in the test scenario, such as the roar of vehicles, the sound of rain and wind, and the tweet of animals, and the display device 610 can display videos in the test scenario from different perspectives. The audio-visual workstation 600 enables the test process of the intelligent vehicle to be displayed in a humanized perspective, which improves the recognizability of the test process and renders the test process less boring.

Due to the integration of the test bench, hardware-in-the-loop sub-system, software-in-the-loop sub-system and target-in-the-loop sub-system, the test system provided herein can meet the requirements of the vehicle-in-the-loop testing, hardware-in-the-loop testing, software-in-the-loop testing, and target-in-the-loop testing for the intelligent vehicles, and generate the multi-source information of the perception layer of the intelligent vehicle, allowing for a more comprehensive testing of intelligent vehicles. At the same time, the testing is performed on the test bench, and the test bench can simulate the resistance of the actual road according to the road resistance parameters and the posture of the actual road according to the road posture parameters, which enables the intelligent vehicle to be tested in a driving environment closer to the actual road, thereby enhancing the test effect, avoiding the risk of road testing, and enabling the repeatable testing.

The present invention is described in detail with reference to the above-mentioned embodiments. It should be understood that changes and modifications made by those skilled in the art without departing from the spirit of the invention should fall within the scope of the invention. For example, various operation steps and components used to perform the same can be implemented in different ways according to specific applications or any number of cost functions associated with the operation of the system (for example, one or more steps can be deleted, modified or incorporated into other steps).

The above embodiments can be implemented entirely or partly through software, hardware, firmware or any combination thereof. In addition, as understood by those skilled in the art, the principles of the invention can be reflected in a computer program on a computer-readable storage medium, which is pre-installed with a computer-readable program code. Any tangible and non-transitory computer-readable storage medium, including magnetic storage devices (such as hard disks and floppy disks), optical storage devices (CD-ROM, DVD, Blu Ray disks) and flash memory, is suitable. These computer program instructions can be loaded on a general-purpose computer, a special-purpose computer, or other programmable data processing devices to form a device capable of exerting the specified function. These computer program instructions can also be stored in a computer-readable memory which can instruct a computer or other programmable data processing devices to operate in a specific manner, so that the instructions stored in the computer-readable memory can form a manufactured product, including devices for exerting a specified function. Computer program instructions can also be loaded on a computer or other programmable data processing devices, so that a series of operation steps are executed on the computer or other programmable devices to complete the computer implementation, enabling the instructions executed on the computer or other programmable devices to be used to implement specified functions.

Although the principles of the disclosure have been shown in the above embodiments, various modifications or changes made to the structures, arrangements, proportions, elements, materials, and components particularly suitable for specific environments and operating requirements without departing from the spirit of the disclosure should fall within the scope of the disclosure.

Obviously, the above-mentioned embodiments are merely illustrative of the disclosure, and are not intended to limit the disclosure. It should be understood that though the disclosure has been described in detail with reference to the embodiments, those skilled in the art can still make various modifications and changes without departing from the spirit of this disclosure, which should fall within the scope of the disclosure. Likewise, the advantages and technical solutions of the disclosure have been described above. However, benefits, advantages, solutions to problems and any elements that can produce the same, or make them more specific, should not be construed as critical and necessary parts. As used herein, term "comprise" or a variation thereof should be interpreted as a non-exclusive inclusion. Specifically, the process, method, article, or apparatus is not limited to the elements listed therein, and should not exclude other elements that are not explicitly listed or are not part of the process, method, system, article or apparatus. In addition, as used herein, the term "couple" and any other variations thereof refer to physical connection, electrical connection, magnetic connection, optical connection, communication connection, functional connection, and/or any other connection manners.

It should be understood that various changes made by those skilled in the art without departing from the spirit of the invention should fall within the scope of the invention defined by the appended claims.

What is claimed is:

1. A system for testing an intelligent vehicle, comprising:
a test bench;
a hardware-in-the-loop sub-system;
a software-in-the-loop sub-system;
a target-in-the-loop sub-system; and
a test management platform;
wherein the test bench is configured to load the intelligent vehicle, and simulate a resistance of an actual road according to road resistance parameters and a posture of the actual road according to road posture parameters;
the test bench comprises a test stand, a road resistance simulation sub-system, a roller, a servo motor and a road posture simulation sub-system;
wherein the road posture simulation sub-system is configured to:
receive posture parameters including slope and inclination of a road model, sent by the test management platform;
calculate a pitch angle and a roll angle of the test stand according to the posture parameters; and
control the test stand to move to a posture corresponding to the pitch angle and the roll angle to realize simulation of the posture of the actual road;
the servo motor is configured to drive the roller; the road resistance simulation sub-system comprises a proportional-integral-derivative (PID) controller, a servo driver and a torque measurement device; and the road resistance simulation sub-system is configured to perform PID control on the servo motor according to the road resistance parameters to allow the servo motor to drive the roller to apply corresponding road resistance to tires of the intelligent vehicle, wherein a difference between the road resistance parameters and a torque of the roller detected by the torque measurement device is calculated by the PID controller;

the hardware-in-the-loop sub-system is configured to construct a specific test environment for a hardware of the intelligent vehicle, and send data of a test scenario to the hardware of the intelligent vehicle via the specific test environment to test response of the intelligent vehicle in the test scenario;

the software-in-the-loop sub-system is configured to input the data of the test scenario into an electronic control unit of the intelligent vehicle to test the response of the intelligent vehicle in the test scenario;

the target-in-the-loop sub-system is configured to present different traffic scenario targets in a specific way, respectively, to test identification and response of the intelligent vehicle to the traffic scenario targets; and the test management platform is configured to generate the data of the test scenario, and send the data of the test scenario to the hardware-in-the-loop sub-system when a hardware-in-the-loop testing is performed, or send the data of the test scenario to the software-in-the-loop sub-system when a software-in-the-loop testing is performed, or control the target-in-the-loop sub-system to present different traffic scenario targets when a target-in-the-loop testing is performed; the test management platform is further configured to generate the road resistance parameters and the road posture parameters, and send the road resistance parameters and the road posture parameters to the test bench; and the test management platform is further configured to receive and save test data of the response of the intelligent vehicle in the test scenario and test data of the identification and response of the intelligent vehicle to the traffic scenario targets.

2. The system of claim 1, wherein the test bench further comprises a steering follow-up sub-system; and the steering follow-up sub-system is configured to follow a steering angle of wheels of the intelligent vehicle to measure the steering angle of the wheels.

3. The system of claim 1, wherein the hardware-in-the-loop sub-system comprises a millimeter-wave radar hardware-in-the-loop module; the millimeter-wave radar hardware-in-the-loop module comprises a millimeter-wave radar anechoic chamber and a millimeter-wave radar target simulator; and the millimeter-wave radar hardware-in-the-loop module is configured to send a millimeter-wave signal to a millimeter-wave radar placed in the millimeter-wave radar anechoic chamber according to the data of the test scenario, so as to perform an anechoic test of the millimeter-wave radar.

4. The system of claim 1, wherein the hardware-in-the-loop sub-system further comprises a camera hardware-in-the-loop module, and the camera hardware-in-the-loop module comprises a video camera obscura and a display; and the display is configured to display a video of the test scenario to a camera placed in the video camera obscura according to the data of the test scenario, so as to perform a camera obscura test of the camera.

5. The system of claim 1, wherein the hardware-in-the-loop sub-system further comprises a vehicle-to-everything device hardware-in-the-loop module; and the vehicle-to-everything device hardware-in-the-loop module is configured to convert information of a traffic participant in the data of the test scenario into vehicle-to-everything air interface signals and send the vehicle-to-everything air interface signals to an on-board unit of the intelligent vehicle, so as to perform an on-board unit-in-the-loop testing; and the vehicle-to-everything device hardware-in-the-loop module is also configured to perform signaling testing on a vehicle-to-everything communication terminal of the intelligent vehicle.

6. The system of claim 1, wherein the target-in-the-loop sub-system comprises at least one of a traffic sign, a gantry, a road marking simulator, a movable object, an obstacle simulator, an environment simulator and an electronic traffic sign;

the traffic sign is placed on the test bench to test a capability of the intelligent vehicle to identify and detect the traffic sign;

the gantry is arranged on the test bench to display gantry information, so as to test a capability of the intelligent vehicle to identify the gantry information;

the road marking simulator is configured to simulate markings of the actual road to test a capability of the intelligent vehicle to identify the markings;

the movable object and the obstacle simulator are configured to drive a mobile platform carrying a simulated traffic participant to move according to a preset route, so as to test a capability of the intelligent vehicle to identify the movable object and an obstacle;

the environment simulator is configured to adjust parameters of a test environment; and the electronic traffic sign is configured to display traffic signs via a LED screen to test a capability of the intelligent vehicle to identify the electronic traffic sign.

7. The system of claim 1, wherein the test management platform generates the data of the test scenario from a database of natural traffic scenarios through a cross-entropy importance sampling method.

8. The system of claim 1, further comprising an audio-visual workstation; and the audio-visual workstation is configured to display videos and sounds of the test scenario.

* * * * *